United States Patent [19]

Nakao et al.

[11] 4,385,332

[45] May 24, 1983

[54] TAPE CASSETTE LID OPENING DEVICE FOR MAGNETIC RECORDING TAPE DRIVING APPARATUS

[75] Inventors: Toshihiro Nakao; Kazuaki Takata; Katsumi Kanayama; Masaaki Daigaku, all of Hachioji; Kazuyasu Motoyama, Tokyo; Yasuo Hattori, Hachioji, all of Japan

[73] Assignee: Olympus Optical Co., Ltd., Tokyo, Japan

[21] Appl. No.: 156,266

[22] Filed: Jun. 3, 1980

[30] Foreign Application Priority Data

Jun. 12, 1979 [JP] Japan ............................. 54-80033[U]

[51] Int. Cl.³ ............................................. G11B 15/02
[52] U.S. Cl. .................................................. 360/96.6
[58] Field of Search ........ 360/96.6; 242/192, 197–200

[56] References Cited

U.S. PATENT DOCUMENTS 4,018,403 4/1977 Schulz ................................ 360/96.6

FOREIGN PATENT DOCUMENTS 2162937 12/1971 Fed. Rep. of Germany ..... 360/96.6

52-18303 2/1977 Japan .................................. 360/96.6

*Primary Examiner*—Robert S. Tupper
*Attorney, Agent, or Firm*—Frishauf, Holtz, Goodman & Woodward

[57] ABSTRACT

A tape cassette lid opening device for a magnetic recording tape driving apparatus provided with a tape cassette loading section for receiving a tape cassette and a capstan projecting from the bottom surface of said tape cassette loading section, comprises a tape cassette lid and a tape cassette lid opening mechanism. The tape cassette lid is pivotally mounted on the magnetic recording tape driving apparatus and is pivotable between a first position, in which the tape cassette lid covers the tape cassette loading section, and a second position, in which the tape cassette lid permits the loading of said tape cassette into the tape cassette loading section and unloading of the tape cassette from the tape cassette loading section. The tape cassette lid opening mechanism includes a motor which causes the pivotal motion of the tape cassette lid from said first position to said second position by means of the driving force of the motor.

7 Claims, 8 Drawing Figures

TAPE CASSETTE LID OPENING DEVICE FOR MAGNETIC RECORDING TAPE DRIVING APPARATUS

BACKGROUND OF THE INVENTION

This invention relates to a driving apparatus for a magnetic recording tape which is accommodated in a tape cassette and which in turn is loaded in the tape cassette loading section of a tape recorder. More particularly, the invention relates to a tape cassette lid opening device for automatically opening a tape cassette lid covering the tape cassette loading section.

The tape cassette lid, as mentioned above, is usually pivotally mounted in the magnetic recording tape driving apparatus is and pivotable between a first position, in which the tape cassette loading section is covered or closed, and a second position spaced apart from the first position.

In its first position, the tape cassette lid prevents intrusion of dust from the outside into the tape cassette loading section. Also in this position, it prevents the tape cassette loaded in the loading section from being damaged by forces exerted from the outside. In its second position, the tape cassette lid permits the loading or unloading of the tape cassette into or out of the loading section.

In the prior art, the movement of the tape cassette lid from the first position to the second, i.e., the opening or eject action, is brought about either manually or by a biasing member such as a spring. With the prior-art tape cassette lid the afore-mentioned opening action is permitted only when an eject switch provided in the magnetic recording tape driving apparatus is operated. When the magnetic recording tape in the tape cassette loaded in the tape cassette loading section, driven from one of pair reel hubs to the other, is entirely wound on that other reel hub, it is necessary to remove or unload the tape cassette from the tape cassette loading section for loading a new tape cassette, or to change the so-called A side of the tape cassette to the B side. With the prior-art tape cassette lid, every time it is necessary to remove the tape cassette the tape cassette lid is opened by operating the eject switch, and then the tape cassette is removed from the loading section by hand. Therefore, the unloading operation is very cumbersome. This cumbersomeness is also encountered when it is intended to record a magnetic signal on a magnetic recording tape by loading a tape cassette without removable lugs for prevention of accidental erasing in the tape cassette loading section without beforehand knowing the fact that the removable lugs are removed.

In another aspect, the prior-art tape cassette lid produces a comparatively loud sound when it is moved from the first position to the second. In a case where the magnetic recording tape driving apparatus is a tape recorder and also when playback of a magnetic signal from the tape, i.e., playback of sound, has been made before the action of opening the tape cassette lid, this comparatively loud sound is liable to spoil the feeling of the audiophile having been addicted to the atmosphere produced by the reproduced sound.

SUMMARY OF THE INVENTION

An object of the invention is to provide a tape cassette lid opening device for a magnetic recording tape driving apparatus, with which not only the afore-mentioned cumbersomeness is eliminated but also the afore-mentioned comparatively loud sound is not produced at the time of the opening action, and also which is simple in construction.

DETAILED DESCRIPTION OF THE PREFERRED EMBODIMENTS

Figure 1:
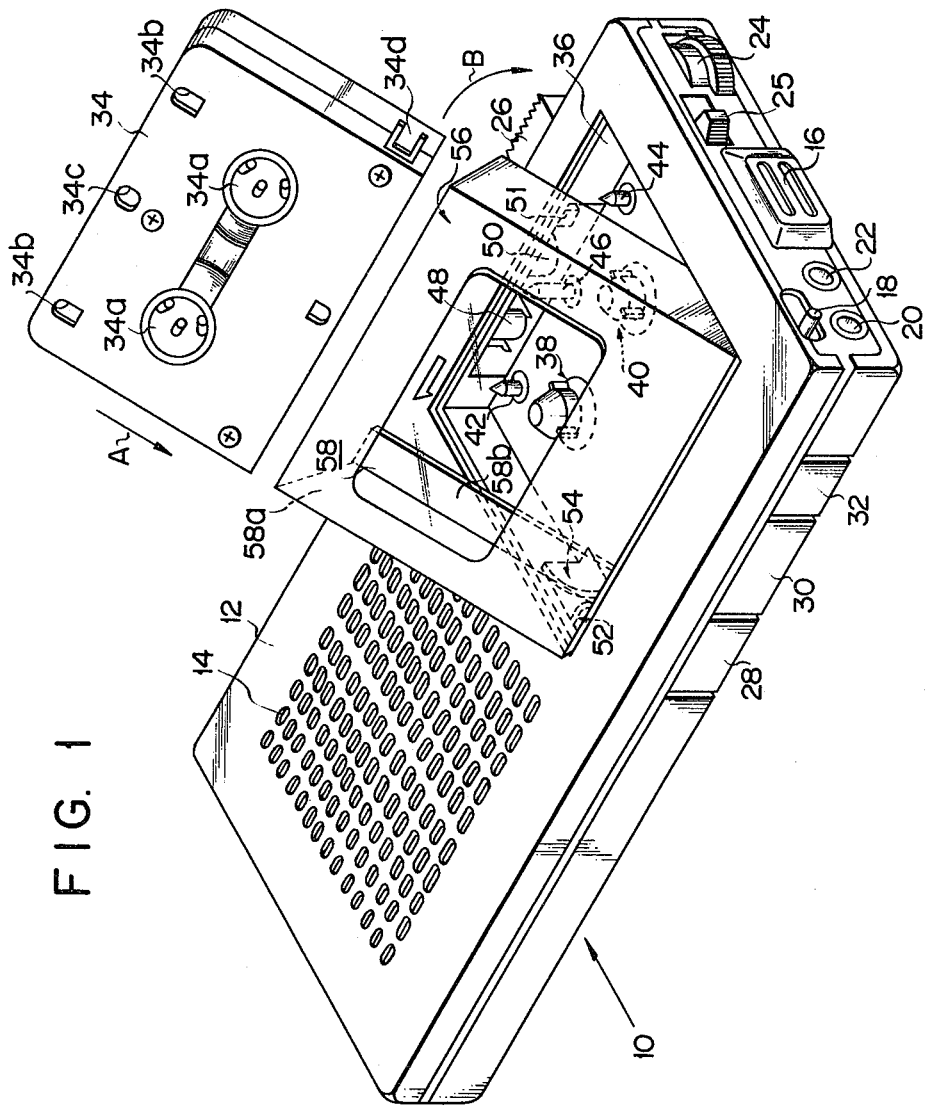
FIG. 1 is a perspective view showing a magnetic recording tape driving apparatus provided with an embodiment of the tape cassette opening device according to the invention, with the tape cassette lid being in the second position.

FIG. 1 shows a magnetic recording tape driving apparatus 10 provided with an embodiment of the tape cassette lid opening device according to the invention. Here, the magnetic recording tape driving apparatus 10 is a tape recorder.

The apparatus 10 has a housing 12, which is provided on the upper side with a loudspeaker 14. The housing 12 is also provided on the front side with an electrostatic type microphone 16, a pause switch 18, plug sockets 20 and 22 for connecting an earphone, a volume control switch 24 for the volume control of the sound produced from the loudspeaker 14 and a fast-feed switch 25 for producing two different fast-feed signals.

The housing 12 is further provided on the right hand side with an eject switch 26 for selectively producing an eject signal, and it is also provided on the left hand side with a stop switch 28 for selectively producing a stop signal, a forward play switch 30 for producing a forward play signal and a record switch 32 for producing a record signal.

Further, the housing 12 includes a tape cassette loading section 36 open at its top for receiving a tape cassette 34 as shown in FIG. 1. In the illustrated case, the tape cassette 34 is of a well-known type, namely a commonly termed microcassette. The casing of the tape cassette 34 is provided with a pair of reel hubs 34*a*, a pair of cassette position regulation pin insertion slots 34*b*, a capstan insertion slot 34*c* and a pair of removable lugs 34*d* for preventing accidental erasing.

In the tape cassette loading section 36, a pair of reel shafts 38 and 40, a pair of cassette position regulation pins 42 and 44 and a capstan 46 project from the bottom surface. The arrangement of the pair of reel shafts 38 and 40, pair of cassette position regulation pins 42 and 44 and capstan 46 within the tape cassette loading section 36 is well known in the magnetic recording tape driving apparatus used with a so-called microcassette. The right hand side of the tape cassette loading section 36 has a recess, in which a recording/playback magnetic head 48, a pinch roller 50 cooperating with the capstan 46 and a tape end detector 51 are provided. The tape end detector 51 produces a tape end signal when it senses a thin metal piece (not shown) applied to the magnetic recording tape in the tape cassette 34 in a portion near the end of the tape. The rear side of the loading section 36 also has a recess formed in a portion near the left hand side, and in this recess part of an accidental erasing prevention device 52 and part of a tape cassette lid opening mechanism 54 are disposed. The accidental erasing prevention device 52 produces an accidental erasing prevention signal if the tape cassette 34 loaded in the loading section 36 does not have the removable lugs 34d.

Figure 2:
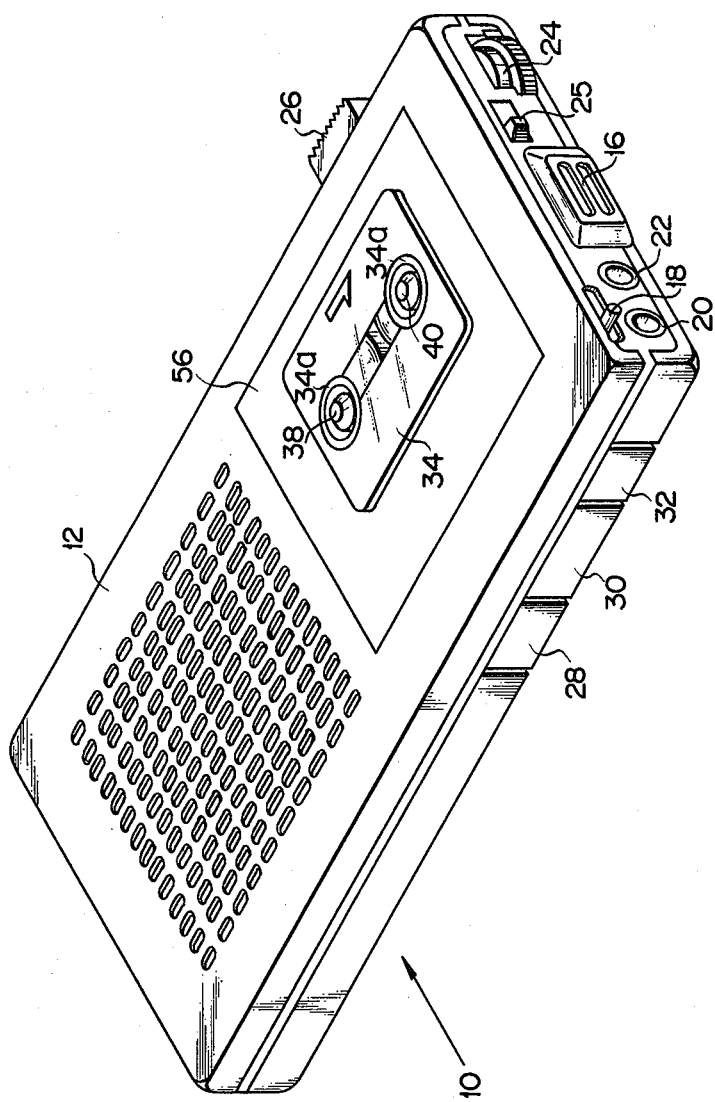
FIG. 2 is a perspective view of the magnetic recording tape driving apparatus shown in FIG. 1, with the tape cassette lid being shown in the first position.

A tape cassette lid 56 is pivoted at its left end to the left side of the tape cassette loading section 36. It is pivotable between a first position, in which the tape cassette loading section 36 is covered as shown in FIG. 2, and a second position spaced apart from the first position, as shown in FIG. 1. In this embodiment, the tape cassette lid 56 is of a so-called kangaroo pocket type provided with a cassette holder member 58.

The tape cassette 34 can be inserted in the direction of arrow A in FIG. 1 into the tape cassette lid 56 and held therein by the cassette holder member 58. The tape cassette lid 56 carrying the cassette 34 inserted therein can be turned about the axis of its rotation provided at its left end from the second position shown in FIG. 1 to the first position shown in FIG. 2 by applying a force to it.

Figure 3:
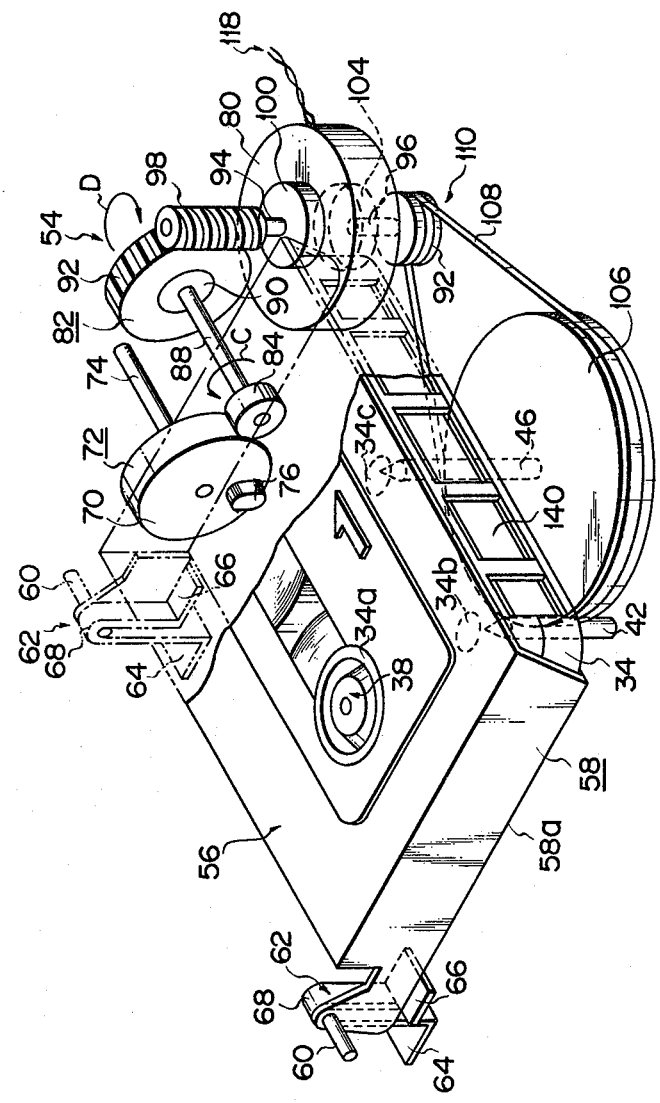
FIG. 3 is a perspective view showing the tape cassette lid and a tape cassette lid opening mechanism, the tape cassette lid being shown in the first position.

FIG. 3 shows the tape cassette lid 56 held in its first position and the tape cassette 34. As shown most clearly in FIG. 3, in this position of the tape cassette 34 the pair of reel shafts 38 and 40 are inserted in the respective reel hubs 34a, the pair of cassette position regulation pins 42 and 44 are inserted in the slots 34b, and the capstan 46 is inserted in the slot 34c.

As shown in FIG. 3, the cassette holder member 58 of the tape cassette lid 56 has right and left side wall portions 58a extending along and parallel to the right and left side walls of the casing of the tape cassette 34 provided with removable lugs 34d. Also, as most clearly shown in FIG. 1, the cassette holder member 58 has cassette retaining portions 58b extending along and parallel to the bottom wall of the casing of the tape cassette 34 near the right and left side edges thereof. The outer surface of the cassette retaining portions 58b faces the bottom of the tape cassette loading section 36 when the tape cassette lid 56 is in the first position.

As shown in FIG. 3, the right and left side wall portions of the cassette holder member 58 have respective, rearwardly projecting tongues provided as a pair. These tongues are provided with respective pins 60 secured therewith and aligned to each other to constitute the axis of rotation of the tape cassette lid 56. Also, they are provided with respective biasing members 62. In the instant embodiment, the biasing members 62 are each constituted by a leaf spring having an end portion 64 secured to a chassis (not shown) accommodated within the housing and another end portion 66 secured to the lower edge of each tongue as shown in FIG. 3. The end portions 64 and 66 are coupled together by a spring portion 68 having a converse U-shaped profile in FIG. 3. The inner surface of the spring portion 68 engages the outer surface of the associated pin 60. The biasing members 62 serve to hold the tape cassette lid 56 in the afore-mentioned first position by their own biasing forces. More particularly, the tape cassette lid 56 is biased by the biasing forces of the biasing members 62 toward the first position while it is being rotated from the first position to the second position.

The cassette lid opening mechanism 54, as most clearly shown in FIG. 3, is disposed near the right side wall portion 58a of the cassette holder member 58 of the tape cassette lid 56. The outer surfaces of the right and left side walls 58a of the cassette holder member 58 lie in planes perpendicular to the imaginary axis line through the pair of pins 60. The cassette lid driving mechanism 54 includes a rotatable member 72 having an end surface 70 extending parallel to the outer surface of the right side wall 58a of the cassette holder member 58, i.e., substantially perpendicular to the afore-mentioned outer surface of the cassette retaining portions 58b. In this embodiment, the rotatable member 72 has a disc-like form. A portion of the end surface 70 is found below the cassette retaining portions 58b of the tape cassette lid 56 held in the first position thereof as shown in FIG. 3. In this position of the tape cassette lid the other portion of the end surface 70 faces the right side wall 58a of the tape cassette lid 56. Integral with and penetrating the center of the rotatable member 72 is a first shaft 74 rotatably supported in the afore-mentioned chassis. The rotatable member 72 has a protuberance portion 76 projecting from the portion of the end surface 70. The peripheral surface of the protuberance portion 76, projecting from the end surface 70, faces the afore-mentioned outer surface of the right side cassette retaining member 58b of the cassette holder member 58.

Figure 4:
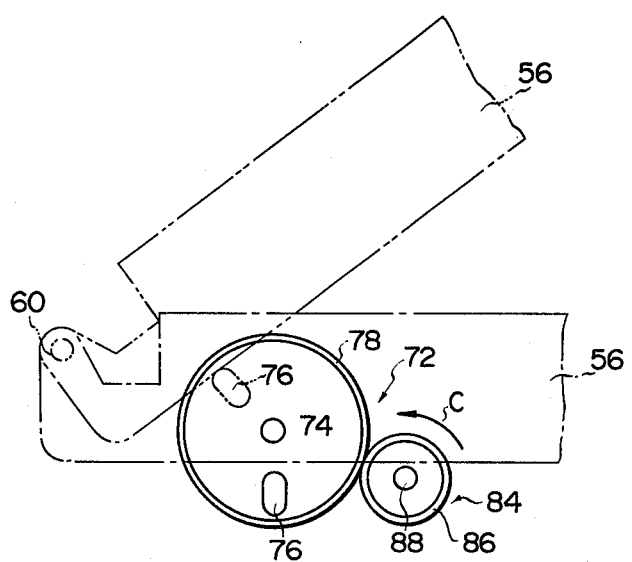
FIG. 4 is a front elevational view showing a rotatable member and a friction wheel of the tape cassette lid opening mechanism of FIG. 3, viewed from the side of the tape cassette lid.

As most clearly shown in FIG. 4, the rotatable member 72 has a peripheral friction layer 78 made of rubber or the like material.

As shown in FIG. 3, the cassette lid opening mechanism 54 also includes a motor 80, which can rotate in the opposite directions at a uniform speed and with the same characteristics, and a power transmission mechanism 82, which transmits the output of the motor 80 to the rotatable member 72 for rotating it.

The power transmission mechanism 82 has a disc-like friction wheel 84, the outer periphery of which is in engagement with the outer periphery of the rotatable member 72. As most clearly shown in FIG. 4, the rotatable member 72 also has a peripheral friction layer 86 made of rubber or the like. Thus, rotation can be reliably transmitted without slip produced between the friction wheel 84 and rotatable member 72. Having one end integral with and penetrating the center of the friction wheel 84 is a second shaft 88 rotatably supported in the afore-mentioned chassis (not shown). The other end of the second shaft 88 is coupled to a first uni-directional clutch 90. The first uni-directional clutch 90 is coupled to a worm wheel 92 concentric with the second shaft 88. It transmits the rotation of the worm wheel 92 to the second shaft 88 to cause rotation thereof in the direction of arrow C only when the worm wheel 92 is rotated in the direction of arrow C.

The motor 80, as shown in FIG. 3, has first and second output shafts 94 and 96 extending parallel to the capstan 46. The first output shaft 94 extends upward from one end surface of the motor 80 and carries a worm gear 98 secured to its one end. The worm gear 98 is in mesh with the worm wheel 92. When it is rotated in the direction of arrow D, it causes rotation of the worm wheel 92 in the direction of arrow C. The other end of the first output shaft 94 is coupled to a second uni-directional clutch 100 which is in turn coupled to an armature (not shown) of the motor 80. The second uni-directional clutch 100 transmits the rotation of the afore-mentioned armature of the motor 80 to the first output shaft 94 to cause rotation thereof in the direction of arrow C only when the armature is rotated in the direction of arrow D. When the armature is rotated in the direction opposite to the direction of arrow D, the second uni-directional clutch 100 prevents the load of the worm wheel 92 and worm gear 94 from being transmitted to the armature. The second output shaft 96 carries a pulley 102 secured to its one end. The other end of the second output shaft 96 is coupled to a third uni-directional clutch 104 which is in turn coupled to the armature of the motor 80. The third uni-directional clutch 104 transmits the rotation of the armature of the motor 80 to the second output shaft 96 to cause rotation thereof in the direction opposite to the direction of arrow D only when the armature is rotated in the direction opposite to the direction of arrow D. As shown in FIG. 3, a pulley 106 which also serves as a flywheel is secured to the lower end of the capstan 46. A belt 108 is passed round the pulley 106 of the capstan 46 and the pulley 102 of the motor 80. In this embodiment, the second output shaft 96, third uni-directional clutch 104, pulleys 102 and 106 and belt 108 constitute a power transmission means 110. The power transmission means 110 transmits the rotation of the armature of the motor 80 to the capstan 46 to cause rotation thereof in the direction of arrow D only when the armature is rotated in the direction opposite to the direction of arrow D.

Figure 5:
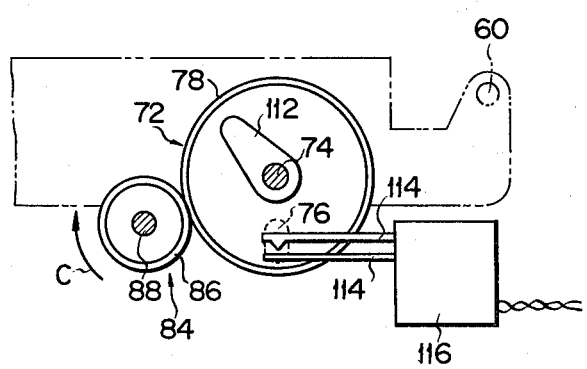
FIG. 5 is a back elevational view showing the rotatable member and friction wheel of the tape cassette lid opening mechanism of FIG. 3 viewed from the side opposite the tape cassette lid, an output stop switch being shown here.

As shown in FIG. 5, the rotatable member 72 has a protruding piece 112 projecting from its other side surface. The protruding piece 112 is provided at a position spaced apart from the protuberance portion 76 by substantially 225° in the direction opposite to the direction of arrow C, i.e., in the counterclockwise direction in FIG. 5. Disposed within the locus of rotation of the protruding piece 112 are a pair of elastic contact pieces 114, made of an electroconductive material, of an output stop switch 116. As shown in FIG. 5, the pair of elastic contact pieces 114 of the output stop switch 116 are found at the same position as the protuberance portion 76 when the latter is brought to the lowermost position. The output stop switch 116 produces an output stop signal when the pair of elastic contact pieces 114 are brought into contact with each other.

Figure 6:
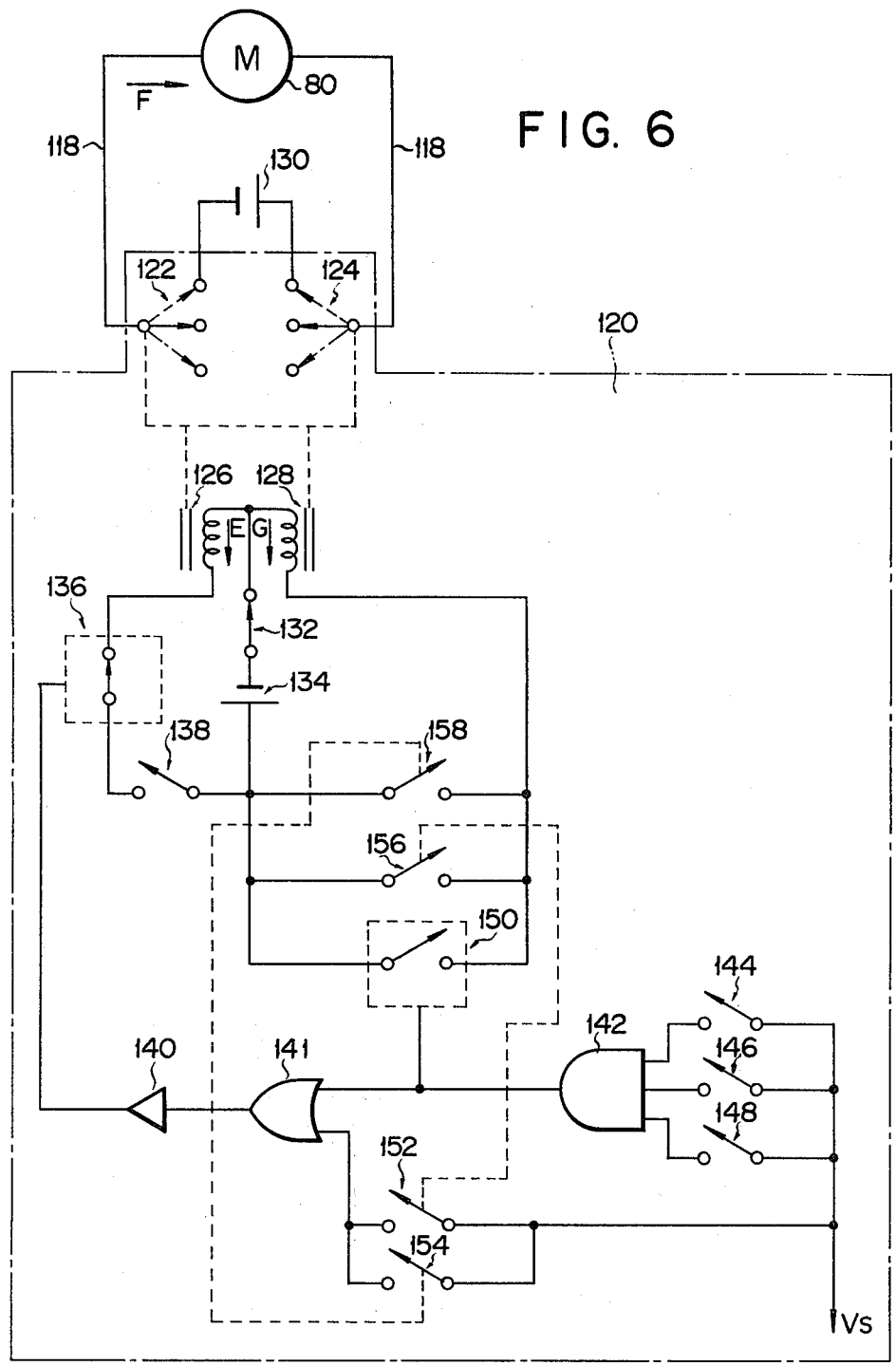
FIG. 6 is a circuit diagram showing a control unit electrically connected to a motor of the tape cassette lid opening mechanism.

As shown in FIG. 6, a pair of lead wires 118 from the motor 80 are electrically connected to respective first and second three-position switches 122 and 124 which are provided within a control unit 120. Normally, the first and second three-position switches 122 and 124 are in their first position as shown by solid arrows in FIG. 6. At this time, no current is supplied to the motor 80. The control unit 120 also includes first and second solenoids 126 and 128. The first solenoid 126 functions such that when current is supplied to it, it brings the first and second three-position switches 122 and 124 to their second position shown by broken line arrows at the same time. For example, when current in the direction of arrow E is supplied to the first solenoid 126, the first and second three-position switches 122 and 124 are brought to the second position by the first solenoid 126 at the same time. At this time, the motor 80 is electrically connected to a direct current power supply 130, which may, in the instant embodiment, be a battery (not shown) accommodated within the housing 12 or a direct current power supply outside the housing 12, and furnished with direct current in the direction of arrow F from the power supply 130, whereby the armature (not shown) is rotated at a constant speed in the direction opposite to the direction of arrow D in FIG. 3. The second solenoid 128 functions such that when current is supplied to it, it brings the first and second three-position switches 122 and 124 to their third position shown by alternate long and short dashed arrows at the same time. For example, when current in the direction of arrow G is supplied to the second solenoid 128, the first and second three-position switches 122 and 124 are brought to the third position by the second solenoid 128 at the same time. At this time, the motor 80 is electrically connected to the power supply 130 and furnished therefrom with direct current in the direction opposite to the direction of arrow F, whereby the armature (not shown) is rotated at the constant speed in the direction of arrow D.

The first solenoid 126 has one terminal electrically connected to a normally-closed first switch 132, which is electrically connected to the anode of a direct current power supply 134, which may, in the instant embodiment, be a battery (not shown) accommodated within the housing 12 or a direct current power supply outside the housing 12. The other terminal of the first solenoid 126 is electrically connected to a first switch element 136 as shown in FIG. 6, which is electrically connected to a normally-open second switch 138 which is in turn electrically connected to the cathode of the power supply 134.

The first switch 132 is mechanically coupled to the stop switch 28 of the magnetic recording tape driving apparatus 10. When the stop switch 28 is depressed, it transmits a mechanical stop signal to the first switch 132 to open the switch 132.

It is also electrically connected to the output stop switch 116 of the magnetic recording tape driving apparatus 10, and it is opened when an output stop signal is produced from the output stop switch 116.

The terminal for controlling the input is electrically connected to the output terminal of an inverter circuit 140. The input terminal of the inverter circuit 140 is electrically connected to the output terminal of an OR circuit 141. The OR circuit 141 has two input terminals, one of which is electrically connected to the output terminal of an AND circuit 142. The AND circuit 142 has three input terminals, which are electrically connected to respective normally-open third, fourth and fifth switches 144, 146 and 148 which are in turn electrically connected to a direct current power supply. The third switch 144 is mechanically coupled to the forward play switch 30 in the magnetic recording tape driving apparatus 10. When the forward play switch 30 is depressed, it transmits a mechanical forward play signal to the third switch 144 to close the switch 144. The fourth switch 146 is mechanically coupled to the record switch 32 of the magnetic recording tape driving apparatus 10. When the record switch 32 is depressed, the record switch 32 transmits a mechanical record signal to the fourth switch 146 to close the switch 146. The fifth switch 148 is mechanically coupled to the accidental erasing prevention device 52 of the magnetic recording tape driving apparatus 10. When the accidental erasing prevention device 52 detects that the tape cassette 34 loaded in the tape cassette loading section 36 does not have the removable lugs 34d, it transmits a mechanical accidental erasing prevention signal to the fifth switch 148 to close the switch 148. The AND circuit 142 produces an output signal when the third, fourth and fifth switches 144, 146 and 148 are all closed. This output signal is coupled through the inverter circuit 140 to the input control terminal of the first switch element 136. The first switch element 136 is opened when the output signal from the inverter circuit 140 is coupled to its input control terminal.

The second switch 138 is mechanically coupled to the forward play switch 30 of the magnetic recording tape driving apparatus 10. When the forward play switch 30 is depressed, it transmits a mechanical forward play signal to the third switch 144 and closes the second switch 138.

The forward play switch 30 is also mechanically coupled to the recording/playback magnetic head 48 and pinch roller 50. When the forward play switch 30 is depressed, the recording/playback magnetic head 48 is brought into contact with a magnetic recording tape 149 (see FIG. 3) in the tape cassette 34 held in the cassette holder member 58 in the state shown in FIG. 3. At the same time, the pinch roller 50 is brought into contact with the magnetic recording tape 149 and pinches the magnetic recording tape 149 in co-operation with the capstan 46. The forward play switch 30 is further mechanically coupled to a select switch (not shown) for selecting either the recording function or playback function of the recording/playback magnetic head 48 to be in force. When the forward play switch 30 is depressed, the select switch renders the playback function of the recording/playback magnetic head 48 into force. The record switch 32 is also mechanically coupled to the select switch. When the record switch 32 is depressed, the select switch renders the recording function of the recording/playback magnetic head 48 into force. The forward play switch 30 is further mechanically coupled to a drive mechanism (not shown) for driving the pair of reel shafts 38 and 40 accommodated within the housing 12. When the forward play switch 30 is depressed, this drive mechanism rotates the pair of reel shafts 38 and 40 in the same direction as the capstan 46.

The recording/playback magnetic head 48 and pinch roller 50 are further mechanically coupled to the stop switch 28 of the magnetic recording tape driving apparatus 10. When the stop switch 28 is depressed, the recording/playback magnetic head 48 and pinch roller 50 are separated from the magnetic recording tape 149 in the tape cassette 34 held in the cassette holder member 58 in the state shown in FIG. 3.

When the forward play switch 30 of the magnetic recording tape driving apparatus 10 is depressed, the armature of the motor 80 is rotated at a constant speed in the direction opposite to the direction of arrow D to cause rotation of the capstan 46 at a constant speed in the direction of arrow D irrespective of whether or not the removable lugs 34d are present. At the same time, the pair reel shafts 38 and 40 are rotated in the same direction as the capstan 46. As a result, the magnetic recording tape 149, which is pinched at this time by the capstan 46 and pinch roller 50, is driven at a constant speed in the direction of the large arrow shown on top of the tape cassette lid 56, and the recording/playback magnetic head 48 converts magnetic signals recorded on the tape 149 into corresponding electrical signals. The electrical signal thus obtained is converted into sound by the loudspeaker 14. When the record switch 32 is depressed in addition to the forward play switch 30, in the presence of the removable lugs 34d the recording/playback magnetic head 48 converts electrical signals supplied from the microphone 16 into corresponding magnetic signals and records them on the tape 149. In the absence of the removable lugs 34d, no current is supplied to the first solenoid 126, and the motor 80 is not rotated in the direction opposite to the direction of arrow D in FIG. 3.

When the stop switch 28 of the magnetic recording tape driving apparatus 10 is depressed, the motor 80 is stopped, and at the same time the recording/playback magnetic head 48 and pinch roller 50 are spaced from the magnetic recording tape 149.

The second solenoid 128 has one terminal electrically connected to the first switch 132 as shown in FIG. 6. The other terminal of the second solenoid 128 is electrically connected to a second switch element 150, as shown in FIG. 6. The second switch element 150 has its control input terminal electrically connected to the output terminal of the AND circuit 142. It is electrically connected to the cathode of the power supply 134. It is opened only when the output signal of the AND circuit 142 is supplied to its input control terminal.

Figure 7:
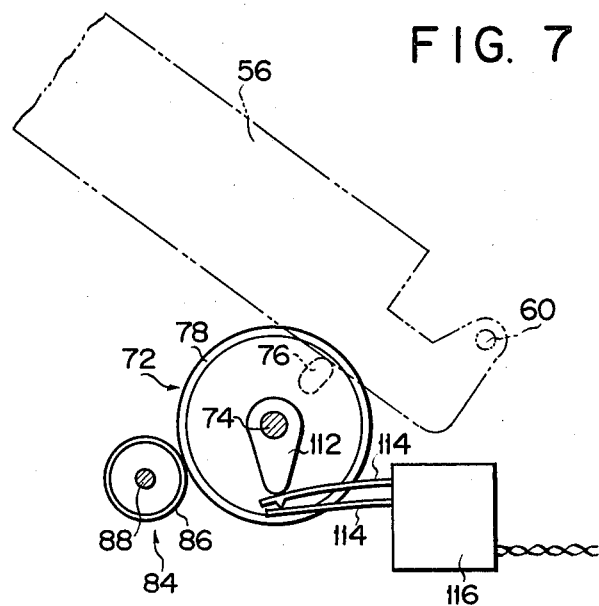
FIG. 7 is a back elevational view showing the output stop switch of FIG. 5 in a state forming a closed circuit.

Thus, when the forward play switch 30 and record switch 32 of the magnetic recording tape driving apparatus 10 are depressed, in the absence of the removable lugs 34d, direct current is supplied to the second solenoid 128 instead of the first solenoid 126 from the power supply 134. At this time, the armature of the motor 80 is rotated in the direction of arrow D in FIG. 3. In this case, the capstan 46 is not driven by the motor 80 due to an action of the third uni-directional clutch 104. On the other hand, the first output shaft 94 of the motor 80 is rotated in the direction of arrow D due to an action of the second uni-directional clutch 100. The rotation of the first output shaft 94 is transmitted by the power transmission mechanism 82 to the rotatable member 72 to cause rotation thereof in the direction opposite to the direction of arrow C. At this time, the protuberance portion 76 is brought into frictional contact with the afore-mentioned outer surface of the right side cassette retaining portion 58b of the cassette holder member 58 of the tape cassette lid 56 in the first position. Then, the tape cassette 56 is turned from the first position toward the second position against the biasing force of the biasing members 62. When the protuberance portion 76 is brought from its position shown by a solid line in FIG. 4 to a position shown by an alternate long and two short dashed line after revolving substantially by 225°, the pair of elastic contact pieces 114 of the output stop switch 116 are brought into contact with each other by the protruding piece 112. As a result, the output stop switch 116 produces an output stop signal to open the first switch 132, thus stopping the direct current supply to the second solenoid 128 to stop the rotation of the armature of the motor 80. At the same time, the tape cassette lid 56 is held in the second position. The tape cassette lid 56 held in the second position is shown by alternate long and two short dashed lines in FIGS. 4 and 7 and also by solid lines in FIG. 1. The tape cassette 34, which is held in the cassette holder member 58 of the tape cassette lid 56, is detached from the tape cassette loading section 36 as the tape cassette lid 56 is brought with it to the second position. In this position of the tape cassette lid 56, the tape cassette 34 is removed from the cassette holder member 58 of the tape cassette lid 56 by moving it in the direction opposite to the direction of arrow A in FIG. 1. With the tape cassette lid 56 in the second position, the first uni-directional clutch 90 permits rotation of the rotative member 72 in the direction of arrow C in FIG. 3. Thus, the tape cassette lid 56 can be brought from the second position back to the first position by urging it in the direction of arrow B in FIG. 1.

The other input terminal of the OR circuit 141, as shown in FIG. 6, is electrically connected to normally-open sixth and seventh switches 152 and 154, which are in turn electrically connected to the same power supply as for the third, fourth and fifth switches 144, 146 and 148. The sixth switch 152 is mechanically coupled to the eject switch 26 of the magnetic recording tape driving apparatus 10. When the eject switch 26 is depressed, it transmits a mechanical eject signal to the sixth switch 152 to close the switch 152. The seventh switch 154 is electrically coupled to the tape end detector 51 in the magnetic recording tape driving apparatus 10. When a tape end signal is produced from the detector 51, the seventh switch 154 is closed. More particularly, when the eject switch 26 is depressed, or when the tape end signal is produced from the tape end detector 51, the output signal from the inverter circuit 140 is added to the input control terminal of the first switch element 136 to open the switch 136. As a result, the rotation of the armature of the motor 80 in the direction opposite to the direction of arrow D in FIG. 3 does not take place.

The afore-mentioned other terminal of the second solenoid 128 is also connected to a normally-open eighth switch 156, as shown in FIG. 6. The eighth switch 156 is electrically connected to the cathode of the power supply 134. It is mechanically interlocked to the sixth switch 152 such that it is closed simultaneously with the closure of the sixth switch 152.

The afore-mentioned other terminal of the second solenoid 128 is further electrically connected to a normally-open ninth switch 158. The ninth switch 158 is electrically connected to the cathode of the power supply 134, and it is mechanically interlocked to the seventh switch 154 such that it is closed simultaneously with the closure of the seventh switch 154.

Thus, when the eject switch 26 is depressed or when the tape end signal is produced from the tape end detector 51, direct current is supplied to the first solenoid 128, and the armature of the motor 80 is rotated in the direction of arrow D in FIG. 3. At this time, the tape cassette lid 56 is turned from the first position to the second position.

Figure 8:
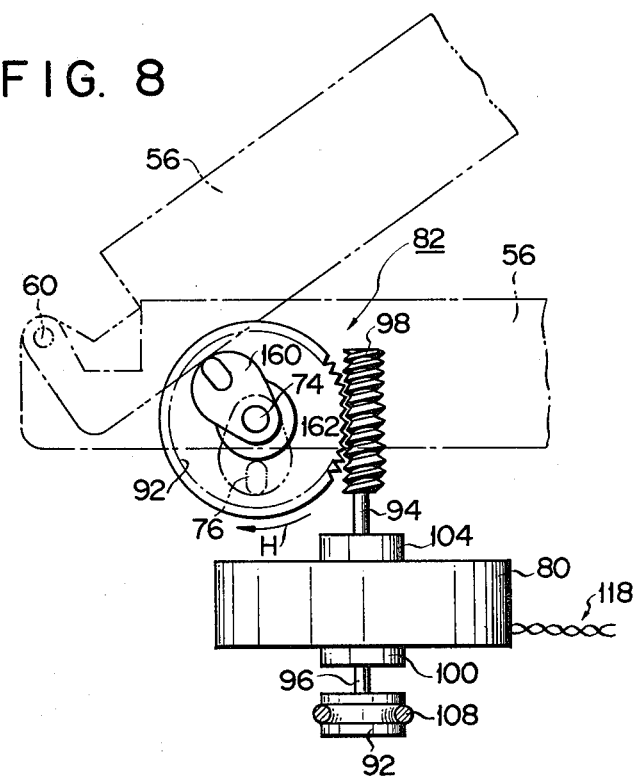
FIG. 8 is a front elevational view showing a modification of a power transmission mechanism shown in FIG. 3.

FIG. 8 shows a modification of the preceding embodiment. In the Figure, the same parts as in the preceding embodiment are designated by the same reference numerals, and the detailed description of them is omitted. In this modification, a cam member 160 is secured to one end of the first shaft 74. It rotates in the same plane as of the rotatable member 72 in the preceding embodiment. Similar to the afore-mentioned end surface 70 of the rotatable member 72, one end surface of the cam member 160 extends parallel to the outer surface of the right side wall portion 58a of the cassette holder member 58 of the tape cassette lid 56, i.e., substantially perpendicular to the outer surface of the right side cassette retaining portion 58b. Part of the afore-mentioned end surface of the cam member 160 is found below the cassette retaining portion 58b of the tape cassette lid 56. The cam member 160 has a protuberance portion 76 projecting from the afore-mentioned end surface. The outer periphery of the protuberance portion 76, projecting from the end surface 70, faces the afore-mentioned outer surface of the right side cassette retaining portion 58b of the cassette holder member 58.

The other end of the first shaft 74 is coupled to a fourth uni-directional clutch 162, which is coupled a worm wheel 92 concentric with the first shaft 74. The fourth uni-directional clutch 162 permits the rotation of the worm wheel 92 to be transmitted to the first shaft 74 for rotating the first shaft 74 in the direction of arrow H only when the worm wheel 92 is rotated in the direction of arrow H. In this modification, the worm wheel 92, worm gear 98, fourth uni-directional clutch 162 and first shaft 74 constitute the power transmission mechanism 82.

Here, the afore-mentioned other end of the first output shaft 94 is coupled to the third uni-directional clutch 104. The afore-mentioned other end of the second output shaft 96 is coupled to the second uni-directional clutch 100. Also, in this example the anode of the power supply 130 shown in FIG. 6 is electrically connected to the second three-position switch 124, and the cathode of the power supply 130 is electrically connected to the first three-position switch 122. Thus, when the first and second three-position switches 122 and 124 are brought to the second position at the same time, the armature (not shown) of the motor 80 is rotated in the direction opposite to the direction of arrow D. When the first and second three-position switches 122 and 124 are brought to the third position at the same time, the armature of the motor 80 is rotated in the direction of arrow D.

As has been described in the foregoing, the tape cassette lid opening device for a magnetic recording tape driving apparatus according to the invention comprises a tape cassette lid pivotally mounted on the magnetic recording tape driving apparatus, which is provided with a tape cassette loading section for receiving a tape cassette and a capstan projecting from the bottom surface of the cassette loading section, and pivotable between a first position, in which the tape cassette loading section is covered, and a second position, in which the tape cassette can be loaded into and unloaded from the tape cassette loading section, and a tape cassette lid opening mechanism including a motor and for causing pivotal motion of the tape cassette lid from the first position to the second position. Thus, not only the tape cassette can be readily loaded into and unloaded out of the tape cassette loading section, but also no loud sound is produced at the time of the opening action.

Also, in the above embodiment of the invention, the tape cassette lid includes a surface which faces the bottom surface of the tape cassette loading section when the tape cassette lid is in the first position, and the tape cassette lid opening mechanism includes a rotatable member having an end surface extending substantially at right angles to the afore-mentioned facing surface and rotatable in a plane substantially at right angles to the facing surface, a protuberance portion projecting from the end surface of the rotatable member and rotatable in union with the rotatable member and in frictional contact with the facing surface of the tape cassette lid, and a power transmission mechanism coupled to the rotatable member and motor for transmitting the output of the motor to the rotatable member to cause rotation thereof.

Thus, less space is required for the installation of the power transmission mechanism.

Further, in the above embodiment of the invention, the power transmission mechanism includes a uni-directional clutch means for transmitting the output of the motor to the rotatable member only when the motor is rotated in one predetermined direction, and an output stop means connected to the motor and operated by either the rotatable member or the tape cassette lid to stop the output of the motor when the tape cassette lid is brought to the second position.

Thus, the tape cassette lid can be smoothly rotated from the second position to the first position.

Still further, in the above embodiment, the motor is rotatable selectively in either one of the opposite directions at the same speed and with the same characteristics, and a power transmission means is provided between the motor and capstan such that it is coupled to both of them and serves to transmit the output of the motor to the capstan to cause rotation thereof at a uniform speed. Thus, compared to the case where a motor for driving the capstan and a motor for the cassette lid opening mechanism are separately provided, it is possible to reduce not only the motor installation space but also the cost by the amount for purchasing one motor.

Further, in the above embodiment the power transmission means includes a uni-directional clutch means for transmitting the output of the motor to the capstan only when the motor is rotated in the other direction than the afore-mentioned predetermined direction. Thus, when the motor is rotated in the other direction, the load on it can be reduced. This means that it is possible not only to reduce heat generation from the motor but also to adopt a low output motor.

Further, in the above embodiment the tape cassette is provided with removable lugs for preventing accidental erasing, the magnetic recording tape driving apparatus is provided with a forward play switch means for selectively producing a forward play signal, a record switch means for selectively producing a record signal, a stop switch means for selectively producing a stop signal, an eject switch means for selectively producing an eject signal, a tape end detecting means for producing a tape end signal by detecting a tape end of the magnetic recording tape in the tape cassette and an accidental erasing prevention means for detecting the presence or absence of the removable lugs on the tape cassette and producing an accidental erasing prevention signal when the removable lugs are absent, and the motor includes a control unit electrically connected to the forward play switch means, record switch means, stop switch means, eject switch means, tape end detecting means and accidental erasing prevention means and functioning to cause rotation of the motor in the other direction at the time of receiving the forward play signal, cause rotation of the motor in the predetermined direction at the time of receiving the forward play signal, record signal and accidental erasing prevention signal, at the time of receiving the eject signal or at the time of receiving the tape end signal and stop the rotation of the motor at the time of receiving the stop signal. Thus, even in a case where the magnetic recording tape driving apparatus is a tape recorder and also when playback of a magnetic signal from the tape, i.e., playback of sound, has been made before the action of opening the tape cassette lid, there is no possibility of spoiling the feeling of the audiophile having been addicted in the atmosphere produced by the reproduced sound.

Further, in the above embodiment the tape cassette lid includes a biasing means for selectively holding the tape cassette lid in the first and second positions with an elastic force. Thus, the tape cassette lid can be stably held in the first and second positions.

Further, in the above embodiment the tape cassette lid is of the kangaroo pocket type. Thus, the tape cassette can be readily loaded in and unloaded out of the tape cassette loading section.

Further, in the above embodiment the rotatable member has a disc-like form, and the power transmission mechanism has a friction wheel in engagement with the outer periphery of the rotatable member for transmitting the output of the motor to the rotatable member. Thus, the power transmission mechanism can be readily manufactured and assembled.

Further, in the above embodiment the power transmission mechanism comprises by a plurality of gears. Thus, not only the output of the motor can be reliably transmitted to the rotatable member, but also the construction of the power transmission mechanism can be simplified.

The above embodiment is given only for the purpose of illustrating the invention and is by no means limitative. Various changes and modifications can be made in the details of the construction without departing from the scope and spirit of the invention.

For example, where the motor 80 is not coupled to the capstan 46 by the power transmission means 110, the motor 80 may be a step-servo motor. In this case, the output stop switch 116 may be dispensed with. The tape end detecting means may be constituted by a device which produces a tape end signal when it detect a remarkable changing of a tension produced in the magnetic recording tape loaded in the magnetic recording tape driving apparatus.

What we claim is:

1. A tape cassette lid opening device for a magnetic recording tape driving apparatus provided with a tape cassette loading section for receiving a tape cassette and a capstan projecting from the bottom surface of said tape cassette loading section, said tape cassette lid opening means comprising:

a tape cassette lid pivotally mounted on said magnetic recording tape driving apparatus and pivotable between a first position, in which the tape cassette lid covers said tape cassette loading section, and a second position, in which the tape cassette lid permits the loading of said tape cassette into said tape cassette loading section and unloading of said tape cassette from said tape cassette loading section, said tape cassette lid further including a bottom facing surface facing said bottom surface of said tape cassette loading section when said tape cassette lid is in said first position; and a tape cassette lid opening means including a motor; and driving means coupled to said motor and to said tape cassette lid for causing the pivotal motion of said tape cassette lid from said first position to said second position via the driven force of said motor;

said driving tape means of said tape cassette lid opening means including a rotatable member having an end surface extending substantially at right angles to said bottom facing surface of the tape cassette lid and rotatable in a plane substantially at right angles to said bottom facing surface of the tape cassette lid; a protuberance portion projecting from said end surface of said rotatable member and rotatable in union with said rotatable member and in frictional contact with said bottom facing surface of said tape cassette lid; and a power transmission means coupled to said rotatable member and to said motor for transmitting the output of said motor to said rotatable member to cause rotation of said rotatable member; and said power transmission means including a uni-directional clutch means for transmitting the output of said motor to said rotatable member only when said motor is rotated in one predetermined direction; and an output stop means coupled to said motor and operated by one of said rotatable member and said tape cassette lid to stop the output of said motor when said tape cassette lid is brought to said second position.

2. A tape cassette opening device for a magnetic recording tape driving apparatus according to claim 1 wherein said motor is rotatable selectively in either one of the opposite directions at the same speed and with the same characteristics, and further comprising a second power transmission means coupled between said motor and said capstan, said second power transmission means transmitting the output of said motor to said capstan to cause rotation of said capstan at a uniform speed.

3. A tape cassette opening device for a magnetic recording tape driving apparatus according to claim 2, wherein said second power transmission means includes a uni-directional clutch means for transmitting the output of said motor to said capstan only when said motor is rotated in the other direction than predetermined direction.

4. A tape cassette opening device for a magnetic recording tape driving apparatus according to claim 2, wherein:

said tape cassette is provided with removable lugs for preventing accidental erasing;

said magnetic recording tape driving apparatus comprises a forward play switch means for selectively producing a forward play signal, a record switch means for selectively producing a record signal, a stop switch means for selectively producing a stop signal, an eject switch means for selectively producing an eject signal, a tape end detecting means for producing a tape end signal by detecting a tape end of the magnetic recording tape in said tape cassette and an accidental erasing prevention means for detecting the presence or absence of said removable lugs on said tape cassette and producing an accidental erasing prevention signal when said removable lugs are absent; and said motor includes a control means electrically connected to said forward play switch means, record switch means, stop switch means, eject switch means, tape end detecting means and accidental erasing prevention means, said control means including means for causing rotation of said motor in said other direction responsive to said forward play signal, and for causing rotation of said motor in said predetermined direction responsive to said forward play signal, record signal and accidental erasing prevention signal, and means responsive to said stop signal in combination with at least one of said eject signal and said tape end signal for stopping the rotation of said motor.

5. A tape cassette lid opening device for a magnetic recording tape driving apparatus according to claim 1, wherein said tape cassette lid is of a kangaroo pocket type.

6. A tape cassette lid opening device for a magnetic recording tape driving apparatus according to claim 1, wherein said rotatable member has a disc-like form, and said power transmission means includes a friction wheel in engagement with the outer periphery of said rotatable member for transmitting the output of said motor to said rotatable member.

7. A tape cassette lid opening device for a magnetic recording tape driving apparatus according to claim 1, wherein said power transmission means comprises a plurality of gears.

* * * * *